(12) United States Patent
Eynard et al.

(10) Patent No.: US 6,669,901 B2
(45) Date of Patent: Dec. 30, 2003

(54) METHOD FOR ELIMINATING LEGIONELLA FROM A COLONISED AQUEOUS FLOW BY ELECTROPULSING, A METHOD FOR TREATING AN AQUEOUS FLOW BY ELECTROPULSING, AND ITS APPLICATION TO ELIMINATING LEGIONELLA

(75) Inventors: Nathalie Eynard, Toulouse (FR); Pierre-Andrè Cabanes, Paris (FR); Justin Teissie, Ramonville St-Agne (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/975,927

(22) Filed: Oct. 15, 2001

(65) Prior Publication Data

US 2002/0172616 A1 Nov. 21, 2002

Related U.S. Application Data

(63) Continuation of application No. PCT/FR00/00982, filed on Apr. 14, 2000.

(30) Foreign Application Priority Data

Apr. 15, 1999 (FR) .............................. 99 04750

(51) Int. Cl.$^7$ ................................. A61L 2/00
(52) U.S. Cl. ...................... 422/23; 422/22; 422/186.04
(58) Field of Search ........................ 422/22, 23, 186.04

(56) References Cited

U.S. PATENT DOCUMENTS

| | | | | |
|---|---|---|---|---|
| 4,457,221 A | * | 7/1984 | Geren | ......................... 204/194 |
| 4,695,472 A | * | 9/1987 | Dunn et al. | .................. 426/237 |
| 5,282,940 A | | 2/1994 | Griffis et al. | |
| 5,326,530 A | * | 7/1994 | Bridges | ......................... 422/21 |
| 5,776,529 A | * | 7/1998 | Qin et al. | .................... 426/231 |
| 6,077,479 A | * | 6/2000 | Milde et al. | ................. 204/263 |
| 6,093,432 A | * | 7/2000 | Mittal et al. | ........... 422/186.04 |

FOREIGN PATENT DOCUMENTS

| | | |
|---|---|---|
| FR | 2 288 060 | 5/1976 |
| FR | 2 513 087 | 3/1983 |
| WO | 94/00861 | 1/1994 |

OTHER PUBLICATIONS

George W. Bates et al., "Fusion of Plant Protoplasts by Electric Fields," *Plant Physiol.*, V. 72, 1983, pp. 1110–1113.

J. Bernhardt et al., "On the Generation of Potential Differences across the Membranes of Ellipsoidal Cells in an Alternating Electrical Field," *Biophysik*, V. 10, 1973, pp. 89–98.

U. Brüggemann et al., "Low–Oxygen–Affinity Red Cells Produced in a Large–Volume, Continuous–Flow Electroporation System," *Transfusion*, V. 35, 1995, pp. 478–486.

T. Grahl et al., "Killing of Microorganisms by Pulsed Electric Fields," *Appl. Microbiol. Biotechnol.*, V. 45, 1996, pp. 148–157.

W.A. Hamilton et al., "Effects of High Electric Fields on Microorganisms: II. Mechanism of Action of the Lethal Effect," *Biochimica et Biophysica Acta*, V. 148, 1967, pp. 789–800.

(List continued on next page.)

Primary Examiner—Krisanne Thornton
(74) Attorney, Agent, or Firm—Young & Thompson

(57) ABSTRACT

The invention relates to a method for treating an aqueous flow colonised by cells by applying a pulsed electric field, the intensity of the field being less than 1 kV/cm. It also relates to the application of this method to eliminating Legionella and to a method for destroying Legionella.

15 Claims, 2 Drawing Sheets

OTHER PUBLICATIONS

H. Hülsheger et al., "Killing of Bacteria with Electric Pulses of High Field Strength," *Radiat. Environ. Biophys.*, V. 20, 1981, pp. 53–65.

H. Hülsheger et al., "Electric Field Effects on Bacteria and Yeast Cells," *Radiat. Environ. Biophys.*, V. 22, 1983, pp. 149–162.

M.M. Kekez et al., "Contribution to the Biophysics of the Lethal Effects of Electric Field on Microorganisms," *Biochim. Biophysis. Acta*, V. 1278, 1996, pp. 79–88.

Kazuhiko Kinosita, Jr., et al., "Voltage–Induced Pore Formation and Hemolysis of Human Erythrocytes," Biochimica et Biophysica Acta, V. 471, 1977, pp. 227–242.

Kazuhiko Kinosita, Jr., et al., "Formation and Resealing of Pores of Controlled Sizes in Human Erythrocyte Membrane," *Nature*, V. 268, 1977, pp. 438–440.

Dietrich Knorr et al., "Food Application of High Electric Field Pulses," *Trends in Food Science and Technology*, V. 51, 1994, pp. 71–75.

Akira Mizuno et al., "Destruction of Living Cells by Pulsed High–Voltage Application," *IEEE Transactions on Industry Applications*, V. 24, 1988, pp. 387–394.

Eberhard Neumann et al., "Permeability Changes Induced by Electric Impulses in Vesicular Membranes," *J. Membrane Biol.*, V. 10, 1972, pp. 279–290.

Bai–Lin Qin et al., "Inactivation of Microorganisms by Pulsed Electric Fields of Different Voltage Waveforms," *IEEE Transactions on Dielectrics and Electrical Insulation*, V. 1, 1994, pp. 1047–1057.

Bai–Lin Qin et al., "Nonthermal Pasteurization of Liquid Foods Using High–Intensity Pulsed Electric Fields," *Critical Reviews in Food Science and Nutrition*, V. 36, 1996, pp. 603–627.

Bai–Lin Qin et al., "Inactivating Microorganisms Using a Pulsed Electric Field Continuous Treatment System," *IEEE Transactions on Industry Application*, V. 34, 1998, pp. 43–50.

Marie–Pierre Rols et al., "Highly Efficient Transfection of Mammalian Cells by Electric Field Pulses," Eur. J. Biochem., V. 206, 1992, pp. 115–121.

A.J.H. Sale et al., "Effects of High Electric Fields on Microorganisms: I: Killing of Bacteria and Yeasts," *Biochim. Biopohys. Acta*, V. 148, 1967, pp. 781–788.

S. Sixou et al., "Specific Electropermeabilization of Leucocytes in a Blood Sample and Application to Large Volumes of Cells," *Biochimica et Biophysica Acta*, V. 1028, 1990, pp. 154–160.

Justin Teissie et al., "Electric Field Induced Transient Pores in Phospholipid Bilayer Vesicles," *Biochemistry*, V. 20, 1981 pp. 1948–1554.

J. Teissieé et al., "Electrofusion of Large Volumes of Cells in Culture: Part II: Cells Growing in Suspension," *Bioelectrochemistry and Bioenergetics*, V. 19, 1988, pp. 59–66.

J. Teissié et al., "Electrofusion of Large Volumes of Cells in Culture," *Bioelectrochemistry and Bioenergetics*, V. 19, 1988, pp. 49–57.

J. Teissié et al., "Large volume Cell Electropermeabilization and Electrofusion by a Flow Process," "Charge and Field Effects in Biosystems III," Allen Ed, Birkhauser Press, 1992, pp. 449–466.

Tian Yow Tsong et al., "Relaxation Phenomena in Human Erythrocyte Suspensions," *Biophysical Journal*, V. 16, 1976, pp. 1091–1104.

Anders Zachrisson et al., "Application of Electric Field Fusion in Plant Tissue Culture," Physiol. Plant, V. 61, 1984, pp. 314–320.

* cited by examiner

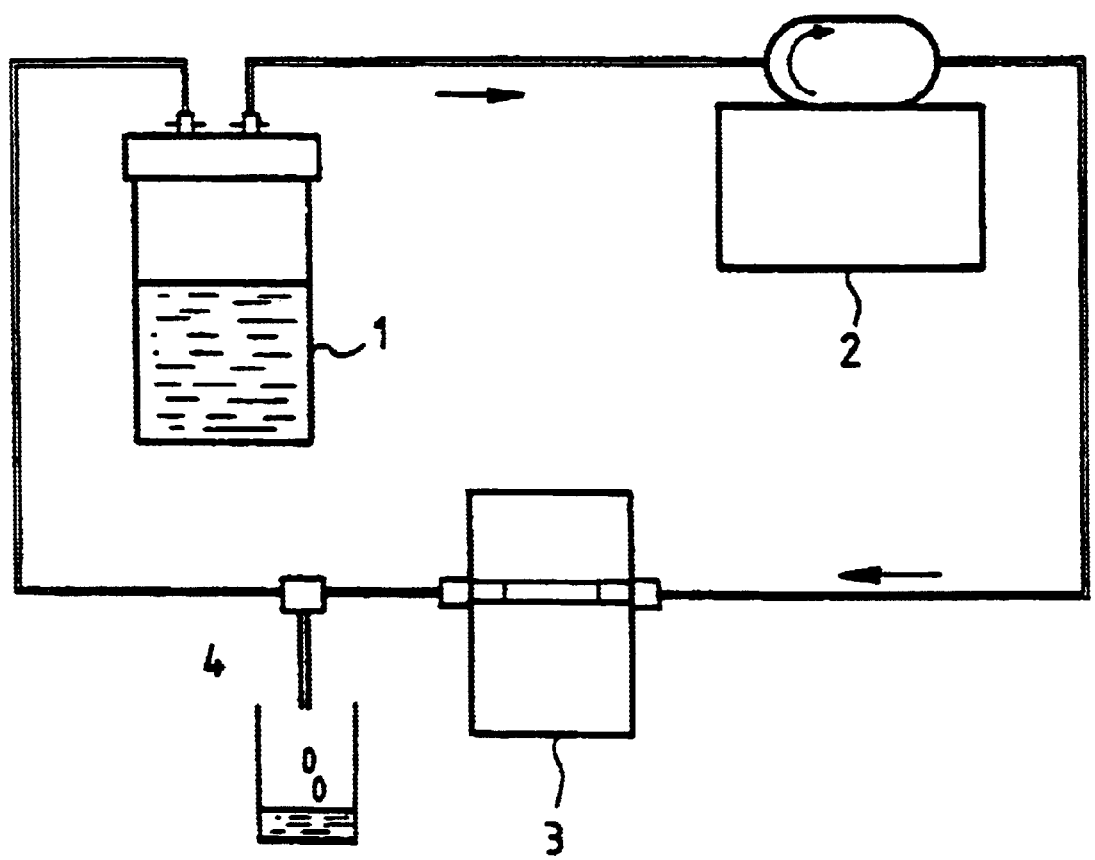

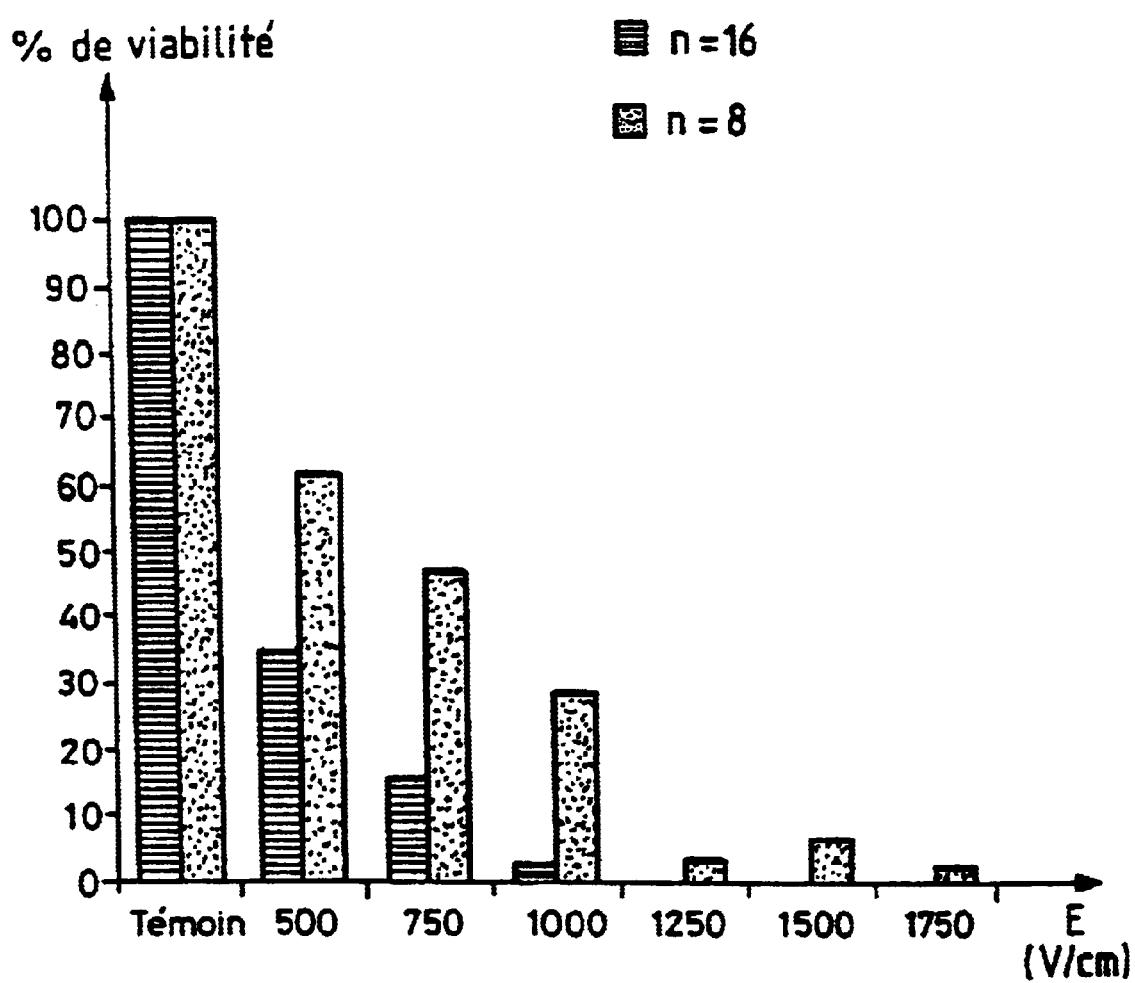

METHOD FOR ELIMINATING LEGIONELLA FROM A COLONISED AQUEOUS FLOW BY ELECTROPULSING, A METHOD FOR TREATING AN AQUEOUS FLOW BY ELECTROPULSING, AND ITS APPLICATION TO ELIMINATING LEGIONELLA

This is a continuation of co-pending international application No. PCT/FR00/00982, filed on Apr. 14, 2000, which designated the United States of America.

The present invention relates to a method for treating an aqueous flow colonised by Legionella by applying a pulsed electric field to the flow, to a method for treating an aqueous flow by electropulsing, and to its application to eliminating Legionella Legionella are Gram negative bacilli that cause a potentially serious pneumonopathy known as "legionnaire's disease" and a benign flu-like syndrome known as "Pontiac fever". It is estimated that the annual number of cases of legionnaire's disease in France is about 3000, of which 400 to 500 have been confirmed by the Centre Nationale de Référence [National Reference Centre].

These bacteria multiply in aqueous media, more readily when the temperature is between 30° C. and 40° C., with survival becoming difficult beyond 50° C. Contamination can occur by inhaling water micro-droplets containing such bacteria, in particular when using hot water for sanitary purposes, mainly from showering and via air conditioning units. In this case, it is not so much the air taken into an air conditioned building that can transport the bacterium (except in the case of dysfunction such as poor positioning of the external air intake), but rather the stream that leaves the coolant tower, generally located on the roof of the building.

With a mortality rate that can be as high as 10%, this disease poses a difficult problem as regards prevention, in particular in a hospital where infirm people can develop the disease more easily, and in thermal facilities, where the water cannot be treated using conventional means.

When a case of legonnaire's disease is diagnosed, a search is made by the services responsible for the contaminating source. When a positive response is obtained, the unit must be decontaminated, which in the example of hot water systems for sanitary purposes, involves several steps in which the boiler temperature is raised (70° C.) followed by "flushing" the plumbing after isolating the circuit in question. Chlorinating with high residual free chlorine levels can also be carried out, independently or combined with the first technique. Unfortunately, in the absence of "continuous" treatment, recolonisation of the system in question is observed over subsequent weeks in the majority of cases.

There is a need for a method and units that can destroy such bacteria effectively, without involving a deleterious secondary effect, such as a risk of burns or the toxic effects of chlorine and which can be operated permanently in an economic manner.

Applying an electric field to cells has already been described: when a cell is placed in an electric field, it distorts the field lines, causing an accumulation of charge on the cell surface. This results in an induced transmembrane potential difference $\Delta V$ which is superimposed on the native difference $\Delta \Psi_0$ [Bernhardt J. and Pauly H. (1973): (2)].

The most complete formula used in the case of a field with square wave kinetics and a spherical cell in suspension is as follows [Sale A. J. H. and Hamilton W. A. (1967): (18); Tsong T. Y. et al., (1976): (24); Kinosita K. and Tsong T. Y. (1977a) (9)]:

$$\Delta V_i = fg(\lambda) r E_t \cos \theta (1 - e^{-t/\tau_p})$$

The expression for this potential difference induced at a point M at time t is a function of:
$E_t$: the intensity of the applied electric field at time t;
f: the form factor for the cell (1.5 in the case of a sphere);
$g(\lambda)$ the factor for membrane permeability $\lambda$;
r: the cell radius;
θ: the angle between the macroscopic electric field vector and the normal to the plane of the membrane at the point considered, M;
$\tau_p$: the charge time for the membrane capacity (of the order of one microsecond);
t: time of application of field.

When the pulse duration is much longer than the time to charge the membrane ($t \gg \tau p$), the term $(1-e^{-t/\tau p})$ tends towards 1 to give the stationary state of the conventional formula:

$$\Delta V_i = fg(\lambda) r E_t \cos \theta$$

The term in cos θ indicates that for a given field, the amplitude of this potential difference is not identical at every point of the cell. It is a maximum at points facing the electrodes (poles) and reduces along the cell surface to become zero at the equator This potential difference generated by the field is added to the native potential difference $\Delta\Psi_0$. This produces a resultant potential difference $\Delta V_r$.

$$\Delta V_r = \Delta \Psi_0 + \Delta V$$

For the cellular hemisphere facing the anode, the numerical values of $\Delta\Psi_0$ and $\Delta V$ add to take into account the vector of the field effect, causing membrane hyperpolarisation. In contrast, for the hemisphere facing the cathode, the numerical values of $\Delta\Psi_0$ and $\Delta V$ subtract and the membrane undergoes depolarisation.

When this resulting membrane potential difference exceeds a threshold value estimated to be 200–250 mV [Teissié and Tsong (1981): (20)], a permeabilisation phenomenon is induced [Neumann E. and Rosenheck K. (1972): (13); Kinosita K. and Tsong, T. Y.: (1977b) (10)].

The membrane structure responsible for this membrane permeability is unknown at the present time, and the term "transient permeabilisation structure" (TSP) is preferentially used, which is usually expressed by the term "pores".

Under particularly drastic electropulsing conditions, electropermeabilisationis an irreversible phenomenon that leads to cell death, or electromortality, in particular in the case of microorganisms [Hamilton and Sale (1967): (5); Sale and Hamilton (1967): (18): Hülsheger et al., (1981): (6), (1983): (7); Mizuno and Hori, (1988): (12); Kekez et al., (1996): (8); Grahl Märkl, (1996): (4)]. This property has been used either to lyse cells to recover a metabolite of interests not naturally excreted by the cell, or to eradicate cells from the environment (disinfecting) or from alimentary fluids (non thermal sterlisation) [Knorr et al., (1994): (11); Qin et al., (1996): (15); Qin et al., (1998): (16)].

Electromortality can occur immediately after electropulsing (short term mortality), or over a longer time period.

Applying pulsed electric fields to cell cultures is known, in particular in a fixed bed [Sale and Hamilton (1967): (18)].

Under those conditions, the sensitivity of the cells is known to depend in particular on the nature and geometry of the electrodes and on the electrical conditions employed (field intensity, number, form and duration of pulses) and on the composition of the medium.

Two pulse systems exist, depending on the volume treated: a fixed bed pulse system, known as a batch system, which can only treat small volumes that depend on the dimensions of the electrodes, and a flow pulse system that can treat a flowing cell suspension. Regarding the flow method, two strategies have been described: continuous flow and sequential flow. In the second model, the pulse chamber is filled, the flow is stopped, the field is applied and the chamber is then emptied.

This sequential flow model was developed for electrofusion work where the contact is mediated by dielectrophoresis [Bates et al., (1983): (1) (Zachrisson and Bonman (1984): (25)].

The advantage of a flow system is that it can be used to treat large volumes.

Usually, flow systems are used wherein the field is perpendicular to the flow [Teissié et al., (1988) (22); Teissié and Rols, (1988): (21); Sixou and Teissié (1990): (19); Teissié et al., (1992): (23); Rols et al., (1992): (17); Bruggemann et al., (1995): (3); Qin et al., (1996): (15)]. Systems with coaxial electrodes produce a non uniform field that is also perpendicular to the flow [Qin et al., (1996): (15); Qin et al., (1998): (16)].

When treating flowing streams, the pulses can be in a square wave form or as an exponential decay (capacitative discharge) [Qin et al., (1994): (14)].

The Applicants have now developed a method for treating a colonised medium by applying a pulsed electric field to a flow of colonised medium, which method overcomes the disadvantages mentioned above (chlorination, re-colonisation, burn risk, economic constraints) even when large volumes of an aqueous medium are to be treated.

In a first aspect, the invention concerns a method for treating an aqueous flow colonised by cells by applying a pulsed electric field with an amplitude, also known as the intensity, of less than 1 kV/cm. The number of pulses applied to the cell can be of the order of 1 to 200. Preferably, the number of pulses applied is of the order of 40 to 200.

The invention also concerns the application of the method to eliminating Legionella.

In a further aspect, the invention concerns a method for destroying Legionella, characterized in that an aqueous flow colonised by Legionella is subjected to a pulsed electric field with an intensity of less than 1 kV/cm. The number of pulses applied to the cells can be of the order of 1 to 200.

Complete eradication of Legionella bacteria can be achieved by electropulsing. The bills results are obtained with low applied field intensities.

The invention will be better understood from the following detailed description made with reference to the accompanying drawings, in which:

FIG. 1 shows a diagram of an apparatus for carrying out the method.

FIG. 2 shows the results of a study on the effect of intensity on the electric field when the number of pulses is doubled.

The term "colonised flow" as used in the invention means any domestic, natural or industrial aqueous medium that may contain or contains Legionella in particular, such as cooling circuits, secondary water distribution circuits, in particular circuits in air conditioning systems, and in general, any medium in which Legionella is capable of living, surviving or multiplying.

The method of the invention is carried out in continuous flow units as shown in the diagram of FIG. 1. A flow of colonised aqueous medium is fed from a reservoir 1, for example by means of a peristaltic pump 2, to an electropulsing chamber 3 where a pulsed field is applied to it, then after treatment, it is fed towards an outlet 4 that recycles the decolonised flow in the case of a closed circuit, or discharges the decolonised flow in the case of a consumable flow (hot water for sanitary purposes) and/or that recovers the decolonised flow for analysis. The solid lines connecting the elements of the circuit in FIG. 1 represent the pipework.

The electropulsing chambers that can be used in the invention, and the generators, are known and are suitable for the flow volumes to be treated. It is also possible to envisage installing electropulsing chambers in parallel, each with their associated generator. To carry out the process of the invention, frequencies of the order of 40 to 60 Hz can be used, in particular about 50 Hz.

Sequential flows can be envisaged as a variation to continuous flows, although continuous flows are preferable. Further, applying a field substantially perpendicular to the flow can be used, but other orientations can be envisaged, in particular substantially parallel to the flow; the method of the present invention can be carried out with a uniform or non-upiform field.

The pulse form can be a square wave form, but other profiles, in particular triangular waves, trapezoidal waves, exponential decay waves or sinusoidal waves can be envisaged. The choice of profile can in particular depend on other parameters such as field intensity, pulse width, and number of pulses. Preferably, square waves are used.

The pulses of the invention can be 1 to 20 ms in duration (width), preferably of the order of 10 ms.

EXAMPLE

Bacteria

The bacterial suspensions used in the experiments were directly prepared from plated colonies. The suspension was produced so as to obtain an $OD_{(650\ nm)} \approx 0.1$ (corresponding to $\approx 2 \times 10^8$ bacteria/ml). The experiments were carried out using *L. pneumophila* isolated from the environment or removed from a hospital environment.

Generators

The generators used in this study (Jouan, France) generated square wave kinetic pulses with a negative polarity. The pulse width could be varied between 0.5 $\mu s$ and 24 ms and the application frequency was 0.1 to 10 Hz when driven internally, and unlimited when driven externally. The voltage delivered by the apparatus was a maximum of 1500 volts (8 amps). If an alternating current was required, a pole changing switch could be connected to the generator's voltage outlet.

Experimental Apparatus

For safety purposes, it was placed inside a laminar flow fume cupboard. The flow rate was adjusted using a peristaltic pump to allow the flow to be adjusted from 0 to 24 ml/mm.

The volume of the electropulsing chamber (w×h×L=0.2× 0.2×2 cm) was 80 $\mu l$. As the electrodes were 2 cm long, the flow rate was adjusted so that the cells were subjected to a number n of pulses during their passage.

Batch

The flow results were obtained after preliminary batch studies. The data obtained allowed optimisation of the electrical parameters to be envisaged to achieve complete mortality of the bacteria at a power compatible with commercial use. The most lethal effect observed with short delays between the pulses allowed the high efficiency use of frequencies of the order of that of the mains (50 Hz) to be envisaged.

The flow cell mortality was optimised by selecting lower amplitudes applied with a larger number of pulses.

Flow

The results show that the sensitivity of flow electropulsed Legionella was of the same order as that previously determined under the heading "batch".

Doubling the number of pulses caused an increase in cell mortality by a factor of 2 to 10 depending on the amplitude of the applied field, as shown in FIG. 2.

Next, the electropulses were all carried out at a frequency of 50 Hz. The amplitude range used (between 100 and 500 V/cm) was substantially reduced compared with the preceding experiments. As a result, the number of pulses applied was increased (up to 200 successive pulses).

The experiments were carried out with a view to determining the electrical conditions that would lead to 100% cell mortality.

| E (V/cm)<br>No. of pulses | 100 | 200 | 300 | 400 | 500 |
|---|---|---|---|---|---|
| 10 | | | | >2% | >2% |
| 20 | | | | >2% | 1% |
| 40 | >2% | >2% | >2% | >2% | |
| 80 | | | | | |
| 120 | 13% | $10^{-5}$% | | | |
| 160 | >0.2% | >0.2% | | | |
| 200 | >0.2% | | | | |

Table 1 above shows the percentage survival achieved after applying a varying number of square wave pulses of different amplitudes. The columns show the change in survival for a given field amplitude and an increasing number of pulses. The rows show the cell survival for a given number of pulses applied at increasing amplitudes.

In the range of test conditions, different couples (amplitude/duration) can be seen that cause complete mortality: either a large number of low amplitude pulses or a smaller number of more intense pulses. In order to determine the best experimental conditions, the energy employed during the different electropulses was calculated.

The energy employed in the experimental volume (80 $\mu$l) was calculated using the following formula:

$W=V.C.E^2.Tp$ (in joules)

in which:

V=sample volume ($8\times10^{-8}$ $m^3$);

C=sample conductance (0.02 Siemens/m);

E=field amplitude (volts/m)

Tp=electropulse duration (n×t) (in sec) where n is variable and t=10 ms

The electrical power necessary was calculated using the formula:

P=W/Tt (in watts), in which Tt=total sample treatment time (in sec).

The difference between Tp (pulse duration) and Tt (treatment duration) was due to the use of pulses separated by periods during which the current amplitude was 0.

At 50 Hz for a pulse duration of t=10 ms (0.01 s), for a number of pulses, we have Tp=n×0.01 s, and Tt=n×0.02 s.

TABLE 2A

Conditions causing 90% to 99% mortality

| E (V/cm) | n | $E^2$ $(V/m)^2$ | n × T (s) | W (J) | P (watts) | W (kJ/$m^3$) |
|---|---|---|---|---|---|---|
| 100 | 120 | 1E + 08 | 1.20 | 0.19 | 0.08 | 2400 |
| 100 | 160 | 1E + 08 | 1.60 | 0.26 | 0.08 | 3200 |
| 100 | 200 | 1E + 08 | 2.00 | 0.32 | 0.08 | 4000 |
| 200 | 40 | 4E + 08 | 0.40 | 0.26 | 0.32 | 3200 |
| 200 | 120 | 4E + 08 | 1.20 | 0.77 | 0.32 | 9600 |
| 200 | 160 | 4E + 08 | 1.60 | 1.02 | 0.32 | 12800 |
| 30 | 40 | 9E + 08 | 0.40 | 0.58 | 0.72 | 7200 |
| 400 | 20 | 1.6E + 09 | 0.20 | 0.51 | 1.28 | 6400 |
| 400 | 40 | 1.6E + 09 | 0.40 | 1.02 | 1.28 | 12800 |
| 500 | 10 | 2.5E + 09 | 0.10 | 0.40 | 2.00 | 5000 |
| 500 | 20 | 2.5E + 09 | 0.20 | 0.80 | 2.00 | 10000 |

TABLE 2B

Conditions causing 100% mortality

| E (V/cm) | n | $E^2$ $(V/m)^2$ | n × T (S) | W (J) | P (watts) | (kJ/$m^3$) |
|---|---|---|---|---|---|---|
| 200 | 200 | 4E + 08 | 2.00 | 1.28 | 0.32 | 16000 |
| 300 | 120 | 9E + 08 | 1.20 | 1.73 | 0.72 | 21600 |
| 300 | 160 | 9E + 08 | 1.60 | 2.30 | 0.72 | 28800 |
| 200 | 200 | 9E + 08 | 2.00 | 2.88 | 0.72 | 36000 |
| 400 | 80 | 1.6E + 08 | 0.80 | 2.05 | 1.28 | 25600 |
| 500 | 40 | 2.5E + 08 | 0.40 | 1.60 | 2.00 | 20000 |

Tables 2a and 2b show the energy and power employed for electrical treatment of a bacterial suspension. Columns 1 to 4 show the field values, the number of pulses applied and the calculation intermediates Tp and $E^2$. Columns 5 and 6 correspond to the energy (W) and power (P) necessary to treat 80 $\mu$l of bacterial solution. Column 7 shows, for each experimental condition, the energy required to treat one cubic metre of suspension.

In these two tables, an analysis for a pulsed volume of 80 $\mu$l reveals a limit as regards the energy to be applied to cause 100% cell mortality. This minimum energy is 1.28 J for 80 $\mu$l, i.e., 16000 kJ/$m^3$. The maximum energy, not causing complete mortality, was 12800 kJ/$m^3$ under the test conditions.

In order to determine the possibility of applying this method commercially, the energy costs were estimated using the energy calculations obtained from the last table.

The calculation employed was:

The power P is given by P=(W×$m^3$ to be treated)/treatment time in seconds, and the energy=P×treatment time in hours.

Under actual operating conditions, the predicted energy cost for total eradication of Legionella was 16000 kJ/$m^3$, i.e., 1.33 kWh for a 300 litre boiler. If the treatment was carried out over 5 hours, the power required would be 270 watts.

Thus a mortality of 90 to 99% (Table 3a) or 100% (Table 3B) could be predicted using the conditions shown in the tables.

REFERENCES

1. Bates, G. W., J. J. Gaynor and N. S. Shekhawat. 1983. Fusion of plant protoplasts by electric fields. *Plant physiol.* 72:1110–1113

2. Bemhardt, J. and H. Pauly. 1973. On the generation of potential differences across the membranes of ellipsoidal cells in an alternating electric field. *Biophysik.* 10:89–98.

3. Bruggemann, U. E. C. Roux, J. Haning and C. Nicolau 1993. Low-oxygen affinity red cells produced in a large volume, continuous flow electroporation system. *Transfusion* 35:478–486
4. Grahl, T. and H. Märkl. 1996. Killing of microorganisms by pulsed electric fields. *Applied Microbiol and biotechnicol.* 45:148–157
5. Hamilton, W. A. and A. J. H. Sale. 1967. Effect of high electric fields on microorganisms II. Mechanism of action of the lethal effect *Biochim. Biophysis. Acta.* 148:789–800.
6. Hülsheger, H., J. Potel and E. G. Niemann. 1981. Killing of bacteria with electric pulses of high field strength. *Radiat. Environ. Biophys.* 20:53–65.
7. Hülisheger, H. J. Potel and E. G. Niemamnm. 1983. Electric field effects on bacteria and yeast cells. *Radiat Environ. Biophys.* 22:149–162.
8. Kekez, M. M., P. Savic and B. F. Johnson. 1996. Contribution to the biophysics of the lethal effects of electric field on microorganisms. *Biochim. Biophysis. Acta.* 1278:79–88.
9. Kinosita, K. and T. Y. Tsong. 1977. Voltage induced pore formation and hemolysis of human erythrocytes. *Biochim. Biophys. Acta.* 471:227–224.
10. Kinosita. K. and T. Y. Tsong; 1977. Formation and resealing of pores of controlled sizes in human erythrocyte membranes. *Nature.* 268:108–114.
11. Knorr, D., M. Gueulen, T. Grahl and W. Sitzmann. 1994 Food application of high electric field pulses. *Trends in food science and technology.* 5:71–75.
12. Mizuno, A. and Yori. 1988. Destruction of living cells by pulsed high voltage application. *IEEE trans. Ind. Appl.* 24:387–394.
13. Neumann, E. and K. Rosenheck. 1972. Permeability changes Induced by electric impulses in vesicular membranes. *J Membr. Biol.* 10:279–290.
14. Qin, B. L. Q. Zhang, G. V. Barbosa-Canovas, B. G. Swanson and P. D. Pedrow. 1994. Inactivation of microorganisms by pulsed electric fields of different voltage wave forms. *IEEE Trans. Dielec. Elec. Insulation* 1:1047–1057.
15. Qin, B. L., U. R. Pothakamury, G. V. Barbosa-Canovas and B. G. Swanson. 1996. Nonthermal pasteurization of liquid foods using high intensity pulsed electric fields. *Critical Reviews in food science and nutrition* 36/603–627.
16. Qin, B. L. G. V. Barbosa-Canovas, B. G. Swanson, P. D. Pedrow and R. G. Olsen.1998. Inactivating microorganisms using a pulsed electric field continuous treatment system. *IEEE transactions on industry applications,* 34:43–50.
17. Rols. M. P. D. Coulet and J. Teissié. 1992. Highly efficient transfection of mammalian cells by electric field pulses. Application to large volumes of cell culture by using a flow system. *Eur. J. Biochem.* 206:115–121.
18. Sale, A. J. H. and W A. Hamilton 1967. Effect of high electric fields on microorganisms: I. Killing of bacteria and yeast. *Biochim. Biophys. Acta.* 148.781–788.
19. Sixou, S. and J. Teissié. 1990. Specific electropermeabilization of leucocytes in blood sample and application to large volumes of cells. *Biochim. Biophys. Acta.* 1028:154–160.
20. Tessié, J. and T. Y. Tsong 1981. Electric field induced transient pores in phospholipid bilayer vesicles. *Biochemistry* 20:1548–1554.
21. Tessié, J. and R. M. P. 1988. Electrofusion of large volumes of cells in culture: 2-Cells growing in suspension. *Bioelectrochem. Bioenerg.* 19:59–66.
22. Tessié, J. and C. P.1988. Electrofusion of large volumes of cells in culture: 1-Anchorage dependent strains. *Bioelectrochem. Bioenerg.* 19:49–57.
23. Tessié,J., S. Sixou and M. P. Rols. 1992. large volume cell electropermeabilization and electrofusion by a flow system, in Charge and field effects in biosystems III Birkhäuser press 449–466.
24. Tsong, T. Y., T. T. Tsong. E. Kingsley and R. Siliciano 1976. Relaxation phenomena in human erythrocyte suspension *Biophys. J.* 16:1091–1104.
25. Zachrisson, A. and C. H. Bomman. 1984. Application of electric field fission in plant tissue culture. *Physiol. Plant.* 61:314–320.

What is claimed is:

1. A method for destroying Legionella in a colonized aqueous flow, comprising applying a pulsed electric field to the aqueous flow, said applied electric field being less than 1 kV/cm.

2. The method according to claim 1, wherein said pulsed electric field is applied to cells with a number of pulses on the order of 1 to 200.

3. The method according to claim 1, wherein the aqueous flow is natural, domestic or industrial.

4. The method according to claim 1, wherein the flow is continuous.

5. The method according to claim 1, wherein the flow is sequential.

6. The method according to claim 1, wherein the electric field is applied substantially perpendicular to the flow.

7. The method according to claim 1, wherein the electric field is applied substantially parallel to the flow.

8. The method according to claim 1, wherein the pulsed electric field delivers pulses at a frequency of 40 to 60 Hz.

9. The method according to claim 1, wherein the pulsed electric field is delivered with a pulse duration of 1 to 20 ms.

10. The method according to claim 1, wherein the pulsed electric field is applied with pulses which are square wave pulses, triangular wave pulses, trapezoidal wave pulses, exponential decay wave pulses or sinusoidal wave pulses.

11. The method according to claim 1, wherein the pulsed electric field is applied with square wave pulses.

12. The method according to claim 1, wherein the pulsed electric field is uniform.

13. The method according to claim 1, wherein the applied field is less than 1 kV/cm and more than 100 V/cm.

14. The method according to claim 1, wherein the pulsed electric field is delivered with pulses which are unipolar or bipolar.

15. The method according to claim 1, wherein the pulsed electric field is delivered with pulses which are unipolar.

* * * * *